Aug. 25, 1964     E. D. FIEDLER     3,145,404
ELECTRIC TOOTHBRUSH
Filed March 4, 1963
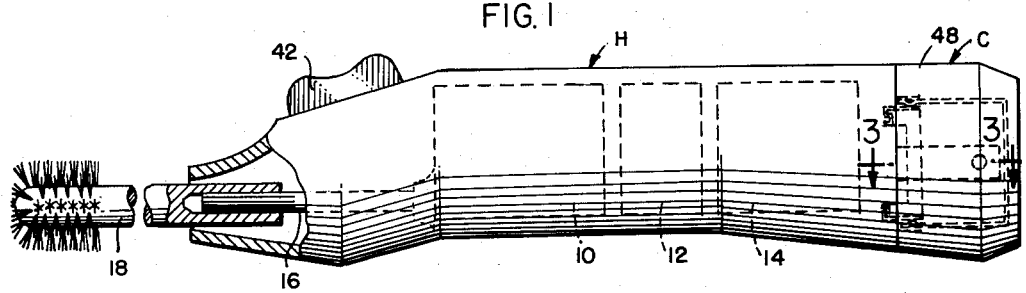
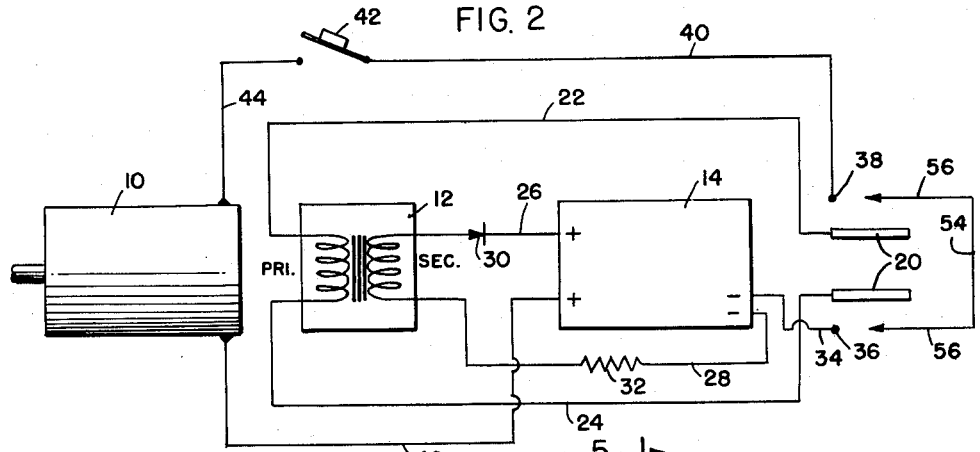
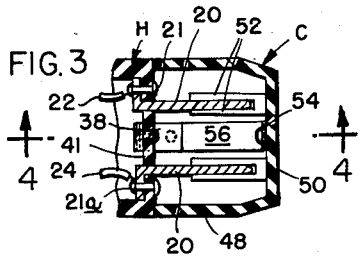 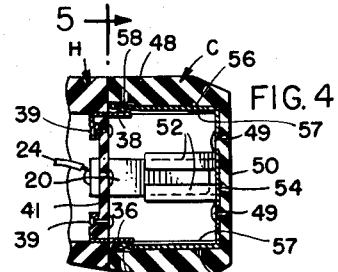
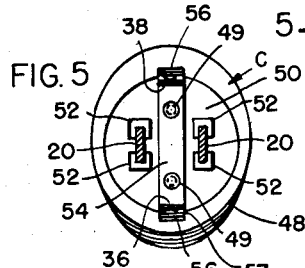
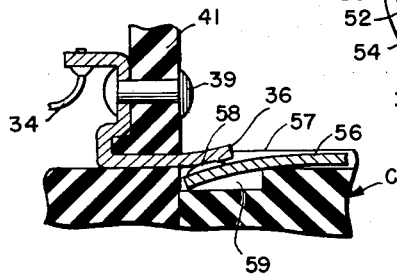
INVENTOR:
EDWARD DONALD FIEDLER
BY
Bair, Freeman & Molinare
ATT'YS

United States Patent Office 3,145,404
Patented Aug. 25, 1964

3,145,404
ELECTRIC TOOTHBRUSH
Edward Donald Fiedler, Lemay, Mo., assignor to Knapp-Monarch Company, St. Louis, Mo., a corporation of Delaware
Filed Mar. 4, 1963, Ser. No. 262,716
5 Claims. (Cl. 15—23)

This invention relates broadly to an electrical appliance provided with safety means to prevent an electrical shock to a person using the appliance.

One object of the invention is to provide a rechargeable cordless electric appliance such as a rotary toothbrush with safety means operable to positively prevent an electrical shock to a person who might try to use the toothbrush while it is connected to an electrical outlet and being charged.

Another object is to provide a rechargeable appliance which includes its own low voltage source of electricity and a step-down transformer and rectifier unit whereby the appliance may be plugged into a high voltage electrical outlet or connected with an extension cord for recharging the low voltage source.

Still another object is to provide a removable cover for the connector prongs of the appliance which must be replaced over the connector prongs after they are disconnected from the high voltage source before the appliance can be operated.

A further object is to provide the circuit between the low voltage source and a motor of the appliance to be energized thereby, which has a gap therein preventing operation of the motor when the cover is removed from the appliance, the cover having bridging means for the circuit gap when in mounted position on the appliance whereupon the appliance may be used with assurance that no high voltage connection exists therewith at the time of such use.

Still a further object is to provide a cover for one end of the housing of the appliance which is mounted thereon by means of sockets that receive the connector prongs and cover them against contact with the user of the appliance, the cover having means to render the appliance operable upon the movement of a switch button to the "on" position but which prevents operation of the motor even though the switch is "on" when the cover is removed.

With these and other objects in view, my invention consists in the construction, arrangement and combination of the various parts of my electric toothbrush, whereby the objects above contemplated are attained, as hereinafter more fully set forth, pointed out in my claims and illustrated in detail on the accompanying drawing, wherein:

FIG. 1 is a side elevation of a rechargeable cordless electrical appliance (such as a toothbrush) embodying my invention and showing diagrammatically the position of a motor, a transformer and a low voltage source of electricity within the housing of the appliance, a cover for the rear end of the housing being shown in mounted position when the appliance is ready for use;

FIG. 2 is a circuit diagram of the components of the appliance;

FIG. 3 is a detailed sectional view on the line 3—3 of FIG. 1;

FIG. 4 is a similar sectional view on the line 4—4 of FIG. 3;

FIG. 5 is a sectional view on the line 5—5 of FIG. 4, and

FIG. 6 is an enlarged fragmentary view of a detail seen in FIG. 4.

On the accompanying drawing I have used the reference character H to indicate the housing of an electrical appliance such as a rotary toothbrush and C a cover for one end thereof. Within the housing H an electric motor 10, a transformer 12 and a rechargeable cell 14 are provided. The motor 10 has a shaft 16 on which is removably mounted a rotary toothbrush element 18.

Referring to FIG. 2, the circuit for the appliance is shown comprising connector prongs 20 from which wires 22 and 24 extend to the primary of the transformer 12, the transformer being a step-down type for high voltage input (110 volts A.C.) and low voltage output suitable for the cell 14). The secondary of the transformer 12 is connected by wires 26 and 28 to the cell which may be one of the nickel-cadmium type. A half wave rectifier 30 is shown in the wire 26 and a resistor 32 in the wire 28 for furnishing the cell 14 with direct current from the secondary of the transformer.

The circuit between the cell 14 and the motor 10 comprises a wire 34 from the cell 14 to a connecting blade 36, a second connecting blade 38 connected by a wire 40 to a switch 42 from which a wire 44 extends to the motor 10, and a wire 46 extending from the motor 10 to the other terminal of the cell 14. It will be noted there is a gap between the connecting blades 36 and 38. A U-shaped bridging element, comprising a cross piece 54 and arms 56 spaced outwardly of blades 36 and 38, is provided for bridging this gap, and will be referred to in greater detail hereinafter.

Referring to FIGS. 3, 4 and 5 the cover C comprises an outer wall 50 and a cylindrical wall 48 formed of insulating material. Pairs of channel-shaped socket members 52 are carried on and project forwardly from the wall 50 and are adapted to frictionally receive therein the connector prongs 20, for the purpose of mounting the cover C in assembled condition on the housing H.

The U-shaped bridging member 56–54–56 is suitably secured to and positioned in the cover C and spaced between the sets of socket members 52 (as best seen in FIG. 3) by means of a pair of projections 49 headed over after passing through perforations of the cross member 54, and with arms 56 positioned in longitudinal recesses 57 defined in cover C. The connector prongs 20 are suitably secured in position on end wall 41 of housing H by rivets 21 and 21a to which the electric leads 22 and 24 connect, while blades 36 and 38 are suitably secured in position on wall 41 by rivets, or other connectors 39 as shown in FIGS. 3 and 4.

FIG. 4 also shows the arms 56 of the bridging element contacting the blades 36 and 38 as when the cover C is in mounted position on the housing H. The member 56–54–56 thereby constitutes a shunting blade to close, or complete, the circuit during normal operation before the motor 10 will operate when the control switch button 42 is depressed.

FIG. 6 illustrates in greater detail, for example, the contact between bridging member 56 and blade 36, it being understood that the detail of contact between arm 56 and blade 38 is similar. The blade 36 is shown formed to define a connection flange to which lead 34 connects. A similar flange is provided on blade 38 to which lead 40 connects. The detail in FIG. 6 shows more clearly the longitudinal groove or recess 57 in which the blade 36 normally lies to be restrained against displacement. Adjacent the end of cover C, the groove 57 is enlarged to define a relief, or recess 59 into which the end of arm 56 may move as it deflects upon contact with the exposed end of blade 36. One of the two contactors, blade 36 and arm 56, is provided with a deflecting enlargement or detent 58 which is appropriately rounded to provide for interference-free engagement and effect a deflection between the parts and to insure contact under pressure from the deflected part. As shown, the blade 36 is very rigidly mounted, and the detent contact 58 is provided on the relatively more flexible arm 56.

From the foregoing description it will be obvious that any electrical hazard to a person using the toothbrush is prevented by preventing him from operating the unit while it is being charged and therefore connected with a high voltage source. In order to charge it, a person must remove the cover C and then plug the housing H into an A.C. outlet. When the cover C is removed for charging, the toothbrush is inoperable.

Some changes may be made in the construction and arrangement of the parts of my electric toothbrush without departing from the real spirit and purpose of my invention, and it is my intention to cover by my claims any modified forms of structure or use of mechanical equivalents which may reasonably be included within their scope.

I claim as my invention:

1. In a rechargeable cordless electrical appliance, a housing, a motor therein, an implement driven by said motor, a low voltage rechargeable source of electricity within said housing for energizing said motor, means carried by said housing and electrically connected to said rechargeable source for recharging said voltage source including exposable connector prongs carried by said housing, a cover for said connector prongs which requires removal to permit said connector prongs to be connected with a high voltage source for recharging said low voltage source, a circuit between said low voltage source and said motor, said circuit having a gap therein, and means carried by said cover for bridging said gap to permit said low voltage source to energize said motor.

2. A rechargeable cordless electrical appliance of the kind claimed in claim 1 wherein said cover is formed of insulating material and is provided with sockets to frictionally receive said connector prongs whereby to mount said cover on said housing.

3. An appliance according to claim 1 wherein said means for recharging said low voltage source also includes a transformer and rectifier mounted in said housing and electrically connected between said connector prongs and said low voltage source of electricity.

4. An appliance according to claim 1 wherein said implement comprises a rotary toothbrush extending from said housing.

5. In a rechargeable cordless electrical appliance, a housing, a motor therein, an implement driven by said motor, a low voltage rechargeable source of electricity within said housing for energizing said motor, means carried by said housing and electrically connected to said rechargeable source for recharging said voltage source including exposable connector prongs carried by said housing, a cover for said connector prongs which requires removal to permit said connector prongs to be connected with a high voltage source for recharging said low voltage source, a circuit between said low voltage source and said motor, said circuit having a gap therein, and a shunting element carried by said cover for bridging said gap whereby said cover is required to be mounted on said housing to permit said low voltage source to energize said motor, said cover, when mounted to cover said connector prongs, preventing the charging of said low voltage source while said appliance is in normal use.

References Cited in the file of this patent

UNITED STATES PATENTS

| | | |
|---|---|---|
| 3,027,507 | Hubner | Mar. 27, 1962 |
| 3,033,197 | Barckley | May 8, 1962 |
| 3,067,373 | Hopt et al. | Dec. 4, 1962 |

FOREIGN PATENTS

| | | |
|---|---|---|
| 1,133,470 | France | Nov. 19, 1956 |